United States Patent Office 2,912,459
Patented Nov. 10, 1959

2,912,459

2-HALO ALKANOYL AMINOBICYCLO (2,2,1) HEPTANE

Werner R. Boehme, Somerville, and Joseph Nichols, Princeton, N.J., assignors to Ethicon, Inc., a corporation of New Jersey No Drawing. Application October 24, 1957
Serial No. 692,059

10 Claims. (Cl. 260—561)

This invention relates to a new series of organic compounds. More particularly, it concerns certain $R(R_1R_2)$N-bicyclo-alkanes and the corresponding alkenes.

The compounds of this invention may be represented by the following general structural formula:

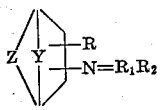

wherein Z is ethylene or vinylene; Y is methylene or ethylene; R and $R_1$ are, interchangeably, hydrogen or lower hydrocarbon, especially lower alkyl, containing from 1 to 7 carbon atoms, for example, methyl, ethyl, propyl, isopropyl, butyl, isobutyl, pentyl, isopentyl, hexyl, isohexyl, etc., and $R_2$ is haloacyl, such as iodoacyl, bromoacyl or, preferably, chloroacyl, the acyl substituent being, for example, acetyl, propionyl etc.

The $R(R_1R_2)$N-bicyclo-alkanes and alkenes of this invention are useful as intermediates in the preparation of the therapeutically active mono- and di-substituted bicyclo-alkanes and alkenes described in our copending application Serial No. 692,058, filed concurrently herewith. These therapeutically active compounds may be represented by the following general structural formula:

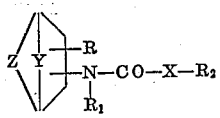

wherein Z is ethylene or vinylene; Y is methylene or ethylene; R and $R_1$ are, interchangeably, hydrogen or lower hydrocarbon; X is alkylene or alkylidene, and $R_2$ is a hydrocarbonamino group attached to X by a carbon to nitrogen bond.

The above-defined compounds, which are useful in the treatment of cardiac arrhythmias because of their marked antiarrhythmic and anti fibrillatory activity, may be prepared by reacting a bicyclo haloamide with a primary or secondary amine such as a dialkylamine, pyrrolidine or piperidine. The reaction may be more clearly visualized by the following illustrative equation:

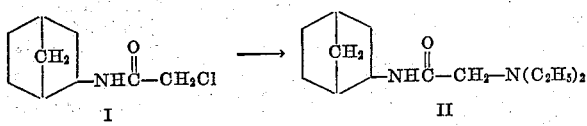

The structure I, above, exemplifies the class of novel intermediates intended to be embraced within the scope of the present invention. This novel class of compounds may be prepared by reacting a bicyclic primary or secondary amine with a haloacyl halide. The reaction is preferably carried out at room temperature, 20°–25° C., or at elevated temperature, preferably in the presence of an acid acceptor such as a liquid organic base, for example pyridine, quinoline, collidine, triethylamine, or lutidine. Also suitable for this purpose are the alkali metal carbonates, for example sodium or potassium hydrogen carbonate. Although the organic base may also function as a diluent, other solvents such as benzene, toluene, ether, or hexane may be used for such purpose.

This is a continuation-in-part of copending application Serial No. 664,180, filed June 4, 1957, which in turn is a continuation of application Serial No. 573,636, filed March 26, 1956, now abandoned.

The following examples are illustrative of the invention, but are not to be construed as limitative thereon.

Example I 15.6 g. of chloracetyl chloride dissolved in 30 ml. of dry benzene was added with stirring and cooling to a solution of 14.5 g. of 2-endoaminobicyclo-(2,2,1)-heptane, which had been prepared according to the method of Alder and Stein, Annalen der Chemie, volume 514, page 224 (1934), and 11.3 g. of pyridine in 75 ml. of dry benzene. The reaction mixture was, after having been allowed to stand for one hour, washed with dilute hydrochloric acid and with water. The benzene solution was concentrated to one-half its volume by distillation under reduced pressure and allowed to crystallize. The crude 2-endo-(chloracetamino)-bicyclo-(2,2,1)-heptane was recrystallized from heptane and from toluene and then melted at 105°–106° C.

A solution of 18.8 g. of recrystallized 2-endo-(chloracetamino)-bicyclo-(2,2,1)-heptane and 16.1 g. of diethylamine in 60 ml. of 95% ethanol was heated in a sealed glass tube at 130° C. for 12 hours. The cooled reaction mixture was distilled under reduced pressure on the steam bath. The solid residue was taken up in 100 ml. of water, acidified slightly with hydrochloric acid and washed with ether. The aqueous solution was made alkaline by the addition of dilute aqueous sodium hydroxide solution and the resulting suspension was shaken with ether. The ether solution was dried over anhydrous potassium carbonate and the ether was removed by distillation. The residue was distilled and 2-endo-(diethylaminoacetamino)-bicyclo-(2,2,1)-heptane was collected at 107–110° C./0.08 mm., $n_D^{25}$ 1.4878.

Gaseous hydrogen chloride was passed into a solution of the distilled 2-endodiethylaminoacetamino)-bicyclo-(2,2,1)-heptane in anhydrous ether. The hydrochloride salt precipitated from the ether solution and was purified by recrystallization from toluene. The recrystallized salt had a melting point of 193–195° C.

Example II

A solution of 63.5 g. of alpha-chloropropionyl chloride in 50 ml. of anhydrous benzene was added to a solution of 55.5 g. of 2-endoaminobicyclo-(2,2,1)-heptane and 45 g. of anhydrous pyridine in 350 ml. of anhydrous benzene during ¾ hour with stirring and cooling. Stirring was continued for one hour longer without cooling. The precipitated pyridine hydrochloride was removed by filtration and washed with benzene. The combined filtrates were then washed with dilute hydrochloric acid and again with water. Distillation of the filtrates on the steam bath under reduced pressure left a solid residue which gave colorless needles of 2-endo-(alpha-chloropropionylamino)-bicyclo-(2,2,1)-heptane melting at 133–134° C., after recrystallization from heptane.

A solution of 20.1 g. of 2-endo-(alpha-chloropropionylamino)-bicyclo-(2,2,1)-heptane and 16.1 g. of diethylamine in 60 ml. of 95% ethanol was condensed as in Example I. The resulting 2-endo-(alpha-diethylaminopropionylamino)-bicyclo-(2,2,1)-heptane was obtained as a colorless liquid boiling at 118–120° C./0.15 mm., $n_D^{25}$ 1.4863.

The hydrochloride prepared as in Example I melted at 167–168° C. when recrystallized from ethyl acetate.

*Example III*

A solution of 50 g. of 2-endomethyl-2-exoaminobicyclo-(2,2,1)-heptane hydrochloride (prepared according to Beckmann et al., Ber., 87, 1001 (1954)) in 200 ml. of water was made alkaline with sodium hydroxide solution and the free amine was extracted with ether. The extracts were dried over solid potassium hydroxide and distilled. 2 - endo-methyl - 2 - examinobicyclo - (2,2,1)-heptane was obtained as a colorless liquid boiling at 163° C. which solidified on cooling.

A solution of 39.1 g. of chloracetyl chloride in 50 ml. of anhydrous benzene was added to a solution of 43.4 g. of 2-endomethyl-2-exoaminobicyclo-(2,2,1)-heptane and 30.1 g. of anhydrous pyridine in 250 ml. of dry benzene in ¾ hour with stirring and cooling. The mixture was stirred for one hour longer without cooling and the precipitated pyridine hydrochloride was washed with benzene. The combined filtrates were washed with dilute hydrochloric acid and with water. The benzene was removed by distillation under reduced pressure on the steam bath and the residue was crystallized several times from heptane. 2-endomethyl - 2 - exo-(chloracetamino)-bicyclo-(2,2,1)-heptane was obtained as colorless needles, melting at 83.5–84.5° C.

A solution of 20.1 g. of 2-endomethyl-2-exo-(chloracetamino)-bi-cyclo-(2,2,1)-heptane and 16.1 g. of diethylamine in 60 ml. of 95% ethanol was heated in a sealed tube at 130° for 16 hours. The product, which was worked up as in Example I, distilled at 109–111° C. at 0.15 mm., $n_D^{25}$ 1.4839. The hydrochloride (prepared as in Example I) was obtained as colorless needles melting at 173–174.5° C. when recrystallized from ethyl acetate.

*Example IV*

2-exoaminobicyclo-(2,2,1)-heptane (prepared according to Alder and Stein, Ann., 514, 224 (1934)) was converted to 2-exo(chloracetamino)-bicyclo-(2,2,1) - heptane melting at 126–127° C. by the procedure described for the endo-isomer in Example I.

2 - exo - (diethylaminoacetamino) - bicyclo - (2,2,1)-heptane (prepared according to the procedure described for the endo-isomer in Example I) was obtained as a colorless liquid boiling at 112–116° C./0.05 mm., $n_D^{25}$ 1.4873.

The hydrochloride (prepared as in Example I) melted at 183–184.5° C. when recrystallized from toluene or methyl ethyl ketone.

*Example V*

2-aminobicyclo-(2,2,2,)-octane (prepared by the method of Seka and Tromposch, Ber. 75, 1381 (1942)) was chloracetylated by the procedure described for 2-endoamino-bicyclo-(2,2,1)-heptane in Example I. The resulting 2-chloracetamino-bicyclo-(2,2,2)-octane melted at 129–130° C. when recrystallized from hexane.

A solution of 21.5 g. of the above chloracetamide and 16.1 g. of diethylamine in 60 ml. of 95% ethanol was condensed as in Example I. The product, which boiled at 120–125° C./0.02 mm., $n_D^{25}$ 1.4913, was converted to the hydrochloride by the procedure described in Example I and melted at 198–200° C. when recrystallized from alcohol-ether.

*Example VI*

43.1 g. of freshly distilled chloral dissolved in 50 ml. of chloroform was added dropwise with stirring during one hour at 0° C. to a solution of 38.2 g. of 2-endoaminobicyclo-(2,2,1)-heptane in 200 ml. of chloroform. The solution was stirred for 2 hours longer without cooling, allowed to stand overnight and distilled under reduced pressure. 2 - endoformylaminobicyclo(2,2,1) - heptane was collected as a colorless viscous oil boiling at 104–108° C./0.05 mm., $n_D^{25}$ 1.5077.

38.0 g. of the above formamide dissolved in 100 ml. of anhydrous ether was added dropwise with cooling and stirring during 1 hour to a suspension of 10.5 g. of lithium aluminum hydride in 400 ml. of anhydrous ether. The suspension was refluxed for 2 hours and the complex decomposed with water and sodium hydroxide solution. The ether layer was decanted, dried over solid potassium hydroxide and fractionated under reduced pressure. 2-endo-(methylamino)-bicyclo - (2,2,1) - heptane was collected as a colorless fuming liquid boiling at 75–77° C./ 33 mm., $n_D^{25}$ 1.4731.

A sample of the base was converted to the hydrochloride in anhydrous ether solution with gaseous hydrogen chloride. The hydrochloride melted at 193–194° C. when reprecipitated from alcohol with ether.

*Example VII*

26.2 g. of chloracetyl chloride dissolved in 30 ml. of anhydrous benzene was added dropwise during ¾ hour with stirring and cooling to a solution of 26.5 g. of 2-endo-(methylamino)-bicyclo-(2,2,1)-heptane and 16.8 g. of pyridine in 300 ml. of dry benzene. The suspension was stirred for 2 hours longer without cooling. The precipitated pyridine hydrochloride was filtered and washed with benzene. The filtrates were distilled under reduced pressure and 2 - endo - (N-methyl-N-chloracetamino)-bicyclo-(2,2,1)- heptane was collected as a colorless liquid, boiling at 120–122° C. 0.15 mm., $n_D^{25}$ 1.5219.

A solution of 20.2 g. of the above chloracetamide and 16.1 g. of diethylamine in 60 ml. of 95% ethanol was condensed by the procedure described in Example I. 2-endo-(n-methyl-N-diethyl-aminoacetamino) - bicyclo - (2,2,1)-heptane boiling at 116–118° C./0.05 mm., $n_D^{25}$ 1.4918 was collected and converted to the hydrochloride as in Example I. The hydrochloride melted at 193.5–194.5° C. when recrystallized from methyl ethyl ketone.

*Example VIII*

33.1 g. of 2-exomethyl - 2 - endoaminobicyclo - (2,2,1)-heptane, prepared according to Beckmann et al., Ber., 87, 1002 (1954), and 32.8 g. of pyridine was dissolved in 175 ml. of dry benzene. 45.2 g. of chloracetyl chloride in 60 ml. of dry benzene was added with stirring at 1–10° C. in one-half hour and stirring continued for 2 hours longer without cooling. The precipitate was filtered off and washed with benzene. The combined filtrates were washed with dilute hydrochloric acid and with water.

The benzene solution was dried by distillation and the residue fractionated under reduced pressure giving 2-exomethyl - 2-endo - (chloracetamino) - bicyclo - (2,2,1)-heptane, an almost colorless liquid solidifying in the condenser B.P. 116–121° C./0.5–1 mm., M.P. 83–90° C. Recrystallization from heptane gave a M.P. of 107–108.5° C.

A solution of 12.9 g. of 2-exomethyl-2-endo-(chloracetamino)-bicyclo-(2,2,1)-heptane and 10.3 g. of diethylamine were heated in a sealed tube in 40 ml. of 95% ethanol at 125° C. for 16 hours and the product, 2-exomethyl-2-endo-(diethylaminoacetamino) - bicyclo-(2,2,1)-heptane, was isolated as in Example I, B.P. 116–120° C./0.08 mm., $n_D^{25}$ 1.4825. The hydrochloride, prepared as in Example I, melted at 189.5–190.5° C. when recrystallized from toluene.

*Example IX*

47.8 g. of beta-chloropropionyl chloride dissolved in 35 ml. of dry toluene was added dropwise with stirring to a solution of 39.7 g. of 2-endoamino-bicyclo-(2,2,1)-heptane and 30.2 g. of dry pyridine in 130 ml. of dry toluene at −10°–0° C. The mixture was worked up as in Example I, resulting in a product which, on recrystallization from hexane, yielded colorless crystals of 2-endo- (beta - chloropropionylamino) - bicyclo - (2,2,1)-heptane, M.P. 98.5–99° C.

A solution of 22.5 g. of 2-endo-(beta-chloropropionylamino)-bicyclo-(2,2,1)-heptane, 0.1 g. hydroquinone and 24.6 g. of diethylamine in 110 ml. of 95% ethanol was worked up as in Example I. The residue, on distillation, gave a liquid (which solidified on cooling), 2-endo-(beta - diethylaminopropionylamino) - bicyclo - (2,2,1)-heptane, B.P. 133–135° C. at 0.08 mm. and which was converted to the hydrochloride as in Example I, M.P. 140–142° C.

*Example X*

A solution of 12.8 g. of chloracetyl chloride in 20 ml. of dry benzene was added dropwise in a half hour at −10–0° C. with stirring to a solution of 11.8 g. of 5-endoamino-bicyclo-(2,2,1)-2-heptene prepared by the method of Parham et al., J.A.C.S., 73 5069 (1951), and 9.4 g. of dry pyridine in 125 ml. of dry benzene. The mixture was stirred 2 hours longer without cooling. The precipitate was filtered, washed with benzene and the combined filtrates were washed with dilute hydrochloric acid and water. Distillation of the benzene solution under reduced pressure gave a liquid which solidified in the condenser, B.P. 92–96° C. at 0.08 mm. Several recrystallizations from heptane gave colorless needles of 5 - endo - (chloracetamino) - bicyclo - (2,2,1) - 2 - heptene, M.P. 79–81° C.

A solution of 9.3 g. of recrystallized 5-endo-(chloracetamino)-bicyclo-(2,2,1)-2-heptene and 8.0 g. of diethylamine in 30 ml. of 95% ethanol was condensed by the procedure described in Example I. 5-endo-(diethylaminoacetamino)-bicyclo-(2,2,1)-2-heptene was collected at 122° C.–126° C./1 mm., $n_D^{25}$ 1.4908, and converted to the hydrochloride, as in Example I, M.P. 148.5–150° C.

What is claimed is:
1. A member selected from the group consisting of compounds having the general formula:

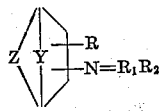

wherein Z is a member selected from the group consisting of ethylene and vinylene; Y is a member selected from the group consisting of methylene and ethylene; R and $R_1$ are, interchangeably, members of the group consisting of hydrogen and lower alkyl, and $R_2$ is halo-lower alkyl carbonyl wherein the halo substituent is a member of the group consisting of iodo, bromo and chloro.

2. The new compound 2-endo-(chloracetamino)-bicyclo-(2,2,1)-heptane.

3. The new compound 2-endo-(alpha-chloropropionylamino)-1-bicyclo-(2,2,1)-heptane.

4. The new compound 2-exo-(chloracetamino)-bicyclo-(2,2,1)-heptane.

5. The new compound 2 - chloracetamino - bicyclo-(2,2,2)-octane.

6. The new compound 2-endo-(N-methyl-N-chloracetamino)-bicyclo-(2,2,1)-heptane.

7. The new compound 2-endomethyl-2-exo-(chloracetamino)-bicyclo-(2,2,1)-heptane.

8. The new compound 2-endo-(beta-chloropropionylamino)-bicyclo-(2,2,1)-heptane.

9. The new compound 2-exomethyl-2-endo-(chloracetamino)-bicyclo-(2,2,1)-heptane.

10. The new compound 5-endo-(chloracetamino)-bicyclo-(2,2,1)-2-heptene.

No references cited.